United States Patent [19]

Johnston

[11] Patent Number: 4,978,474

[45] Date of Patent: Dec. 18, 1990

[54] SEALANT

[75] Inventor: Thomas K. Johnston, Brentwood, Mo.

[73] Assignee: United Technologies Automotive Inc., Dearborn, Mich.

[21] Appl. No.: 77,277

[22] Filed: Jul. 24, 1987

[51] Int. Cl.$^5$ .................................... H01B 1/22
[52] U.S. Cl. ..................... 252/500; 252/511; 252/512; 252/518; 521/89; 521/92; 521/139; 524/505; 525/216
[58] Field of Search ............... 252/500, 512, 511, 518; 524/505; 521/89, 92, 139; 525/216

[56] References Cited

U.S. PATENT DOCUMENTS

| | | | |
|---|---|---|---|
| 1,947,894 | 2/1934 | Whitworth | 188/234 |
| 2,347,172 | 4/1944 | Cox | 200/166 |
| 2,452,805 | 11/1948 | Sussenbach | 106/193 |
| 2,510,727 | 6/1950 | Sussenbach | 260/33.2 |
| 2,666,835 | 1/1954 | Elleman | 219/10 |
| 2,806,509 | 9/1957 | Bozzacco et al. | 154/28 |
| 2,909,643 | 10/1959 | Graves, Jr. | 219/117 |
| 3,214,564 | 10/1965 | Katzer et al. | 219/92 |
| 3,230,290 | 1/1966 | Nelson et al. | 264/320 |
| 3,277,268 | 10/1966 | Williams et al. | 219/92 |
| 3,401,253 | 9/1968 | Foster | 219/121 |
| 3,437,783 | 4/1969 | Lemelson | 219/117 |
| 3,558,422 | 1/1971 | Hamilton | 161/185 |
| 3,602,682 | 8/1971 | Hoeffleur | 219/92 |
| 3,795,047 | 3/1974 | Abolafia et al. | 29/625 |
| 3,855,044 | 12/1974 | Riel | 161/89 |
| 3,875,434 | 4/1975 | Harden et al. | 252/500 |
| 4,195,215 | 3/1980 | Clarke | 219/91.2 |
| 4,680,316 | 7/1987 | Douglas | 525/216 |

Primary Examiner—Robert A. Wax

[57] ABSTRACT

The present invention discloses a heat pumpable expandable weld through sealant comprising a combination of a terpolymer and a copolymer, a curing agent, electrically conductive particles and a blowing agent. Also disclosed is a method of bonding two metal components using this sealant.

5 Claims, 1 Drawing Sheet

U.S. Patent    Dec. 18, 1990    4,978,474

SEALANT

TECHNICAL FIELD

The technical field to which this invention relates is sealants and particularly to electrically conductive sealants useful in welding processes.

BACKGROUND OF THE INVENTION

In the automobile industry there are many metal components which when assembled overlap one another. This overlapping creates problems both through noise generation due to vibration when the vehicle is in motion and corrosion due to trapped water between the members. In order to eliminate these problems the industry has tried welding or tack welding these components to eliminate the vibrational noise. Additionally, it has been disclosed that application of a sealant between the members or substrates being welded will enhance the elimination of moisture getting between the welded members and causing corrosion (U.S. Pat. No. 4,195,215).

However, the introduction of such sealants into the welding process causes a number of problems for the process. First, due to the nonuniformity of electrical conductivity of sealant, uneven welds may occur even where electrically conductive particles have been introduced into the sealant to reduce this problem. Secondly, the organic sealant often causes the welding electrodes to reach higher temperatures than normally required to weld the materials thereby reducing significantly the number of weld which can be performed before replacement of the electrodes is required and thirdly, the sealant often times is incapable of filling the gaps between the welded members thereby not adequately preventing the introduction of water into this area and therefore not preventing corrosion from occurring.

Sealants which are capable of expanding have been used to bond automobile components together but do not possess the appropriate electrical properties to be practical in weld through operation as they would cause reduced electrode life and a low quality weld.

Therefore what is needed in this art is a pumpable weld through sealant which will not cause the welding electrodes to deteriorate quickly, and will more effectively seal any gap between the welded substrates to more effectively prevent corrosion.

DISCLOSURE OF THE INVENTION

The present invention discloses an expandable, weld through sealant comprising a curable polymeric sealant, electrically conductive particles, and a blowing agent such that the rheology of the resulting composition may be applied to the substrate by a pump at temperatures below the cure temperature and the activation temperature of the blowing agent.

Further disclosed is a method of welding two or more metal substrates together by an expandable, pumpable weld through sealant on at least one of the substrate surfaces, such that the sealant will be positioned between the two substrates to be welded and causing the weld to be generated through the two substrates and the sealant. Then subsequently heating the sealant to a sufficient temperature to activate the blowing agent thereby causing the sealant to expand and cure.

The foregoing, and other features and advantages of the present invention will become more apparent from the following description and accompanying drawings.

BEST MODE FOR CARRYING OUT THE INVENTION

Figure 1:
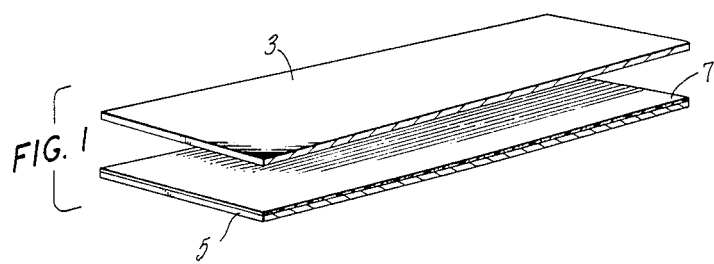
FIG. 1 is a cross-section of two substrates to be welded and a sealant on one surface.

The weld through, expandable sealants of the present invention will have a polymeric curable composition which is capable of expanding and may be applied via pumping, i.e. robotic pump application. One pumpable sealant which may be adapted is disclosed in commonly assigned U.S. Pat. No. 4,680,316 (the contents of which are incorporated herein by reference).

Generally these expandable pumpable sealants will contain elastomeric materials either as monomers or polymers or mixtures thereof The particular elastomer should have the characteristics which will lend them to welding. In other words they should not readily decompose under welding conditions and should be fluid enough at the application temperature (or can be compounded through the use of plasticizers or extenders etc. to be fluid enough) to allow them to be pumped under reasonable pressure and temperature. Additionally, the elastomers should be capable of being cured (cross-linked etc.) with the properly selected curing agent or at sufficient heat which would be above the temperature at which the elastomer is to be pumped.

Additionally, the elastomer, as formulated to form the sealant, must be capable of expanding when a blowing agent is activated in the sealant.

A number of candidate elastomers which may be useful in the preparation of the sealant are, ethylene, propylene, diene terpolymer rubber, butyl rubber, acrylonitile rubber, cross-linkable polyethylene, and styrene butadiene rubber copolymers and terpolymers and mixtures thereof.

The preferred composition comprises a mixture of styrene butadiene copolymer and styrene/butadiene/-divinyl benzene terpolymer. This combination offers good expansion properties, thermal stability at generally practiced weld temperatures in the automobile industry and good rheology or flow characteristics which make a good pumpable sealant.

The styrene/butadiene copolymer should have an average molecular weight of from about 50,000 to about 125,000 while the terpolymer should be a high molecular weight material and should have an average molecular weight of about 250,000 to about 450,000. Also the copolymer should comprise a styrene/butadiene ratio of from about 10% styrene to about 40% styrene by weight of the copolymer. Depending on the particular pumping requirements and additional extenders and plasticizers added to the composition, the amount of the terpolymer in the terpolymer and copolymer mixture will vary from about 5% to about 50% by weight, with the preferred being from about 12% to about 20% by weight. As is known in the art it may be necessary to add a curing agent or system to the polymeric composition to cause it to cure properly. These curing agents will be conventional and should not cause the polymeric composition to cure at or below the same temperatures at which it is being applied. However, the polymer should cure at a rate compatible with forming an expandable polymer. These curing agents and systems may include accelerators to adjust the speed at which the cure takes place to enhance the production of the final expanded sealant. Such accelerators are conventional as are the combinations of accelerator and curing agent to produce the desired result. Typically the curing agents are present in amounts ranging from about 2% to about 15% by weight of the polymeric composition. A representative list of some curing agents and accelerators are Sulfur, zinc oxide, lead peroxide, tetraethylthiuram disulfide ethyl urea 2-mercaptobenzothiazole.

The electrically conductive particles introduced into the sealant are required to lower the resistance of the sealant and allow uniform distribution of the current to effect a uniform weld. The particles may be in the shape of balls, beads, irregular nuggets or flakes (such as is found in metal flux powder). These particles may be made of any electrically conductive material. Some more common ones may be steel, iron, nickel or aluminum. There is no size limitation on these particles except that they should not be so large that they interfere with the expansion of the sealant or cause difficulty in the operation of the pump. Preferably these particles should range in size from about 19 microns to about 150 microns and most preferably should have substantially all of the particles (about 80% or more) ranging in size from about 10 microns to about 45 microns.

Typically these particles will be present in percent by weight of the sealant from about 2% to about 20%.

The other ingredients of these sealants are conventional both in concentration and selection consistent with the preparation of a foam product or a sealant.

In order to cause the sealant to expand the composition must contain a blowing agent or blowing system. The blowing agent or blowing system should not be activated at or below the temperature at which the sealant is applied to the substrate. However, it should activate at or above the cure temperature of the sealant or at some temperature consistent with creating an expanded sealant after the welding has taken place. Generally these temperatures will range from about 120° F. to about 160° F. for application to the substrate and should be capable of curing and expanding at temperatures of about 300° F. to about 350° F.

These systems will vary depending on the particular sealant composition. However, such systems are known to those skilled in the art and are conventional. Typical blowing agents which may be used are shown in Table 1.

TABLE 1

Blowing Agents sodium bicarbonate
p,p'-oxybis-(benzene-sulfonyl hydrazide)
azodicarbonamide
dinitrosopentamethylenetetramine Typically these agents are present in amounts ranging from about 1% to about 5% by weight of the sealant.

Additionally, to comply with certain specifications, it is often necessary to prepare a sealant which is fire retardant. Therefore it is advisable to introduce a fire retardant into the sealant. Again these materials are conventional and a list of some of them may be found in Table 2.

These materials are usually present in amounts below 20% by weight of the sealant and typically about 5% to about 20% by weight

TABLE 2

Antimony trioxide
Penta bromo diphenyl oxide
Deca bromo diphenyl oxide
Chlorinated polyethylene
Chlorinated wax
Chlorinated plasticizers Further additives which may be used to control the pumpability of the material may be gelling agents to control the sag of the applied sealant. Again these materials are conventional and will be present from about 0% to about 30% by weight of the sealant, some of the preferred materials are listed in Table 3.

TABLE 3

Bentone clay
Fumed silica

Plasticizers may be included to adjust the pumpability of the sealant. The conventional materials will likely be present in amounts ranging from 50 phr to 500 phr (phr means parts per hundred rubber or elastomer constituent). A list of some plasticizers are found in Table 4.

TABLE 4 dioctyl phthalate
diundecyl phthalate
dioctyl adipate
cresyl diphenyl phosphate
Sunthene 410 napthenic petroleum oil
diisodecyl phthalate
Paraplex G-30 polymeric plasticizer
Any number of other materials may also be used such as phthalate esters, adipate esters, phosphate esters, napthenic processing oils, rosin esters, dibenzoate esters, polymeric polyesters, petroleum hydrocarbon resins, and various waxes (i.e. petroleum, vegetable and animal)

In certain applications it may be desirable to have the sealant adhere to the substrate. Therefore, it is contemplated that an adhesion promoter might be introduced into the sealant. These could be comparable thermosetting materials or thermoplastic ones. Naturally these materials and these curing agents (if necessary) should react at the temperatures and conditions under which the sealant is cured. Some conventional adhesion promoters are listed in Table 5.

TABLE 5

Epoxies
Novalac epoxies
Hydrocarbon resins
Terpene
Alpha-methyl styrene
Acrylic resins Typically these will be present in amounts ranging from about 2.5% by weight to about 20% by weight of the sealant.

Other conventional additives may be rubber extenders such as polyethylene, polybutylene, polypropylene, polyisobutylene, polybutylene, and polybutadiene. Typically these materials will be present in amounts ranging from about 0 to about 100 PHR (parts per hundred rubber). The particular additive and amount will depend on the desired properties of the final sealant composition.

The method of manufacturing these sealants is conventional in which the constituents are added together and mixed (using a banbury or a Baker Perkins mixer) to form a homogeneous sealant.

The resulting sealant should be capable of being pumped onto the substrate, wherein the term pumped means that the sealant may be forced to flow through a heated applicator gun under pressure from a reciprocating pump or a gear operated pump or other pressurizing means.

The metal components are then placed between welding electrodes and tack welded The welded component is then exposed to sufficient heat to cause the sealant to cure and expand.

Figure 2:
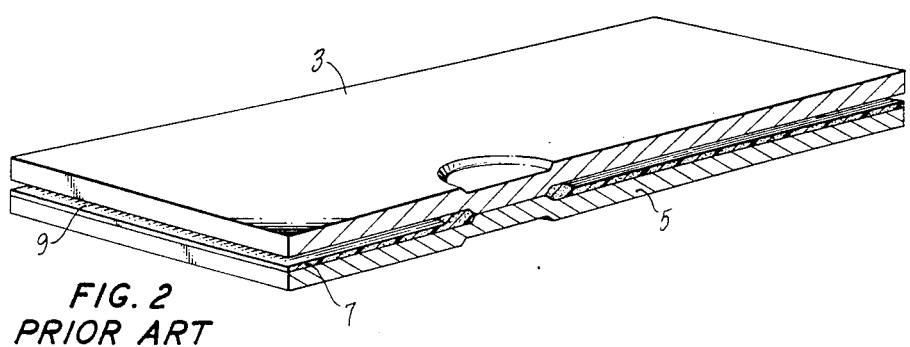
FIG. 2 is a cross-section of the prior art showing a weld using prior art sealant.
Figure 3:
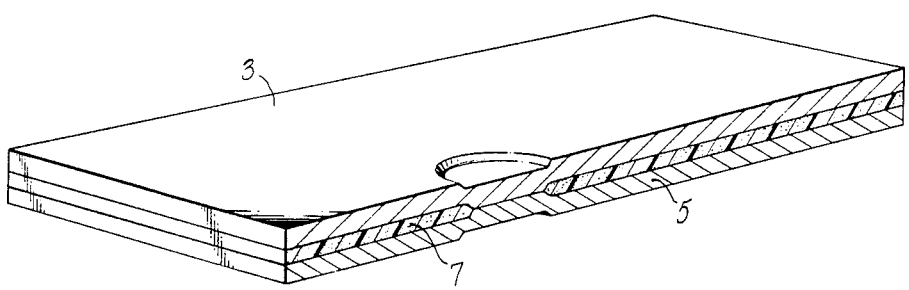
FIG. 3 is a cross-section of a weld using the present invention.

To clarify the advantage of invention refer to the Figures. FIG. 1 depicts two metal components 3 and 5 to be welded. One of the surfaces of component 5 has a layer of sealant positioned on it. FIG. 2 depicts the two metal components 3 and 5 after they have been tack welded. In this figure it is seen that the area about the weld has a gap which is open and capable of trapping moisture which eventually cause the metal to rust. FIG. 3, however, depicts the two metal components 3 and 5 having been tack welded in which the sealant of the present invention was used. As may be seen the gap 9 which generated about the weld has now been filled with the sealant as it expanded during cure thereby effectively sealing out water or moisture from entering this area.

A further advantage of the present invention is that it has been found that by the removal or nonincorporation of relatively high concentration of the inorganic fillers used in many sealants the number of welds which can be acheived before the weld tips require replacing can be increased dramatically. For example where sealants containing about 20% by weight of the sealant of calcium carbonate filler may only allow about 30 welds before the weld tips need replacing whereas the sealant of the present invention may allow upwards of 300 to 700 welds with the same weld tips It should be understood that the invention is not limited to the particular embodiments shown and described herein, but that various changes and modifications may be made without departing from the spirit and scope of this novel concept as defined by the following claims.

I claim:

1. A heat pumpable expandable weld through sealant consisting essentially of:
   a diblock copolymer of styrene butadiene rubber;
   a terpolymer of butadiene-styrene divinyl benzene; and effective amounts of:
   c. electrically conductive particles;
   a fire retardant;
   a blowing agent; and
   f. a curing agent to cure the styrene butadiene copolymer and terpolymer wherein the terpolymer is present from about 5% to about 50% by weight of the total copolymer and terpolymer combined.

2. The sealant of claim 1 wherein the diblock copolymer has a molecular weight range of about 50,000 to about 125,000 and the ratio of styrene to butadiene ranges from 10:90 to 40:60.

3. The sealant of claim 2 wherein the terpolymer has a molecular weight range from about 250,000 to about 450,000.

4. The sealant of claim 1 wherein substantially all of the electrically conductive particles range in size from about 10 microns to about 100 microns.

5. The sealant of claim 1 wherein the electrically conductive particles comprise about 2% by weight to about 20% by weight of the total composition.

* * * * *